(12) United States Patent
Olson

(10) Patent No.: US 11,359,597 B2
(45) Date of Patent: Jun. 14, 2022

(54) COMBINED PUMPED HYDRO AND THERMAL ENERGY STORAGE

(71) Applicant: Gaylord Olson, Princeton, NJ (US)

(72) Inventor: Gaylord Olson, Princeton, NJ (US)

( * ) Notice: Subject to any disclaimer, the term of this patent is extended or adjusted under 35 U.S.C. 154(b) by 0 days.

(21) Appl. No.: 17/386,218

(22) Filed: Jul. 27, 2021

(65) Prior Publication Data

US 2021/0404435 A1 Dec. 30, 2021

Related U.S. Application Data

(63) Continuation-in-part of application No. 16/907,242, filed on Jun. 20, 2020, now Pat. No. 11,105,568, which is a continuation-in-part of application No. 16/592,538, filed on Oct. 3, 2019, now Pat. No. 10,724,769.

(60) Provisional application No. 62/766,131, filed on Oct. 4, 2018, provisional application No. 63/138,575, filed on Jan. 18, 2021, provisional application No.
(Continued)

(51) Int. Cl.
*F03B 13/06* (2006.01)
*F28D 20/00* (2006.01)

(52) U.S. Cl.
CPC .......... *F03B 13/06* (2013.01); *F28D 20/0043* (2013.01); *F28D 2020/0078* (2013.01)

(58) Field of Classification Search
CPC ............... F03B 13/06; F28D 20/0043; F28D 2020/0078
See application file for complete search history.

(56) References Cited

U.S. PATENT DOCUMENTS

| | | | | |
|---|---|---|---|---|
| 4,206,608 A | * | 6/1980 | Bell | ........................ F03D 9/28 60/698 |
| 4,382,365 A | * | 5/1983 | Kira | ........................ F03G 3/00 60/641.11 |
| 4,443,707 A | | 4/1984 | Scieri et al. | |

(Continued)

FOREIGN PATENT DOCUMENTS

| | | | | |
|---|---|---|---|---|
| CA | 2765065 A1 | * | 12/2010 | .......... F24D 10/003 |
| CN | 106677969 A | * | 5/2017 | |
| EP | 0191516 A1 | * | 8/1986 | .............. F03B 13/06 |

OTHER PUBLICATIONS

English Translation of CN-106677969-A (Year: 2017).*
English Translation of EP-0191516-A1 (Year: 1986).*

*Primary Examiner* — David J Teitelbaum
(74) *Attorney, Agent, or Firm* — RosserIP, LLC; Roy Rosser

(57) ABSTRACT

A system and method of combining pumped hydro and thermal energy storage is disclosed that has upper and lower fluid storage reservoirs. The reservoirs are used as a pumped energy storage system in which excess electrical power is stored as gravitational potential energy by using it to transfer fluid up to the upper one. At a later time, the fluid is run back down through a turbine under the force of gravity to generate electricity. Either, or both, fluid storage regions are also used to store thermal energy transferred into the stored fluid via liquid-to-liquid heat exchangers. The stored thermal energy is later extracted out to be distributed in for use in either directly heating structures or to improve the heating efficiency of one or more heat pumps in a district heating system. The fluid may be water, or it may be any suitable high-density fluid such as drilling mud.

14 Claims, 3 Drawing Sheets

Related U.S. Application Data

63/174,831, filed on Apr. 14, 2021, provisional application No. 63/185,237, filed on May 6, 2021.

(56) References Cited

U.S. PATENT DOCUMENTS

| | | | |
|---|---|---|---|
| 8,127,542 B1 * | 3/2012 | Dolcimascolo | F03B 13/06 60/398 |
| 8,492,918 B1 * | 7/2013 | Kamenov | F03B 13/06 290/43 |
| 8,766,469 B2 * | 7/2014 | Payre | F03D 9/14 290/52 |
| 2007/0068184 A1 * | 3/2007 | Mueller | F25B 13/00 62/260 |
| 2010/0259044 A1 * | 10/2010 | Muchow | E03B 11/12 290/43 |
| 2012/0274070 A1 | 11/2012 | Payre et al. | |
| 2019/0271294 A1 * | 9/2019 | Freedman | F01K 13/02 |
| 2020/0011151 A1 * | 1/2020 | Toews | C09K 8/572 |
| 2020/0109861 A1 | 4/2020 | Olson | |
| 2020/0171406 A1 * | 6/2020 | Bedi | C13B 25/00 |

* cited by examiner

COMBINED PUMPED HYDRO AND THERMAL ENERGY STORAGE

CROSS-REFERENCE TO RELATED APPLICATIONS

This application is a continuation-in-part of U.S. Ser. No. 16/907,242 entitled "System and Method for Managing Source Fluid" filed on Jun. 20, 2020, which in turn is a continuation-in-part of U.S. Ser. No. 16/592,538 entitled "System and Method for Providing Usable Source Fluid" that was filed on Oct. 3, 2019 and issued as U.S. Pat. No. 10,724,769 on Jul. 28, 2020 and which claims priority to U.S. 62/766,131 filed on Oct. 4, 2018 entitled "Hybrid water and air source heat pump system and method", the contents of all of which are fully incorporated herein by reference.

This application is also a non-provisional of U.S. 63/138,575 entitled "Combined Pumped Hydro and Thermal Energy Storage" filed on Jan. 18, 2021, a non-provisional of U.S. 63/174,831 entitled "Multi-Source Heat Pumps for Large Scale Applications" filed on Apr. 14, 2021, and a non-provisional of U.S. 63/185,237 entitled "Multi-Source Heat Pumps for Large Scale Applications" filed on May 6, 2021, the contents of all of which are hereby fully incorporated by reference.

BACKGROUND OF THE INVENTION

(1) Field of the Invention

The invention relates to energy storage in fluid reservoirs, and more particularly to storing and retrieving both gravitational potential energy and thermal energy using the same fluid reservoir.

(2) Description of Related Art

Many energy conservation, or storage, projects require expensive infrastructure. This typically has to be built at the start of the project, making such projects costly to initiate and difficult to justify, especially if any monetary payback is only realized over the lifetime of the project, which may be many years. There are, however, certain energy conservation or storage systems in which dual use may be made of much of the necessary infrastructure, so that the startup costs may be spread over both budgets. Two such compatible applications are thermal storage ponds and pumped hydro energy storage. Both of these applications may use small to medium sized, liquid reservoirs as the energy storage medium. These are typically expensive to construct and normally have to be completed at the beginning of the project. By using a single reservoir for both purposes, i.e., both for storing the thermal energy and for storing the gravitational potential energy, the cost of their construction may be spread over the budgets of both applications.

Thermal energy stored in ponds, or reservoirs, can, for instance, be used to supply heating or cooling directly to buildings, such as, but not limited to, homes, offices, and factories. Such thermal storage reservoirs may also, or instead be used to supply appropriately thermally conditioned source fluid that may significantly increase the efficiency of heat pumps used for heating or cooling buildings.

Pumped hydro energy storage can also use reservoirs to store gravitational potential energy. This may, for instance, be accomplished by pumping a fluid, such as water, up from a lower source of fluid to an upper storage facility using pumps, or turbines, powered by off-peak, or excess electricity. Then, when electricity is required, electricity may be generated by flowing the fluid down from the upper storage facility through the turbines via gravity. Although the lower fluid source may be a river, or a lake, in many projects the lower fluid source may also be a purpose-built pond, or reservoir. Such a design means that the fluid may be conserved, i.e., reused, which also allows the fluid to be used more effectively for thermal storage.

The relevant prior art includes:

U.S. Pat. No. 4,443,707 issued to Scieri et al. on Apr. 17, 1984, entitled "HYDRO ELECTRIC GENERATING SYSTEM" that describes a "hydroelectric generating system to produce power by changing the potential energy of water to kinetic energy to drive a turbine that is coaxially connected to a generator. Water from the ambient enters the reservoir and is directed by a valve to a conduit to the turbine which turns a generator to produce electricity. The system is constructed in such a matter that it may supply power during peak power demand and be used as a storage system during low power demand", the contents of which are hereby incorporated by reference.

US Patent Application 2012-0274,070 submitted by Payre et al. and published on Nov. 1, 2012 entitled "METHOD AND AN INSTALLATION FOR PRODUCTION SUPPLEMENTARY ELECTRICAL ENERGY" that describes an "installation for producing supplementary electrical energy for an electricity network includes at least first and second water reservoirs, the first water reservoir being situated at a first level and the second water reservoir being situated at a second level lower than the first level, a communicating pipe between the first water reservoir and the second water reservoir being provided with a remote-controlled valve, and a hydro-electric generating system being provided with a pumping installation. The first and/or second water reservoir is integrated in the foundations in the lower portion of an artificial building that needs to be built for a primary function independently of a secondary function of producing electricity. The first water reservoir or the second water reservoir may constitute a common body of water in the vicinity of ground level. The water reservoirs integrated in foundations of buildings may in particular cooperate with installations for air-conditioning or heating the buildings at the base of which they are constructed, or associated buildings".

US Patent Application 20200109861 submitted by G. Olson and published on Apr. 9, 2020, entitled "SYSTEM AND METHOD FOR PROVIDING USEABLE SOURCE FLUID", the contents of which are hereby incorporated by reference, that describes a "system and method for providing useable source fluid from a thermal exchange unit and/or one or more thermal exchange and storage units. The application also describes topologies that allow operation in a variety of modes, including an air source, a ground source, a preconditioning, a parallel and a simultaneous mode. In the air source mode conditioned source fluid is obtained exclusively from an air-to-liquid heat exchanger. In the ground source mode source fluid is obtained exclusively from a ground heat exchanger. In the preconditioning mode source fluid from the air-to-liquid heat exchanger is used to condition a ground heat exchanger. In the parallel mode source fluid is obtained from both the air-to-liquid heat exchanger and a ground heat exchanger. In the simultaneous mode, source fluid from the air-to-liquid heat exchanger is used to improve the thermal condition of a ground heat exchanger while source fluid for the heat pump is obtained from another ground heat exchanger".

Various implementations are known in the art but fail to address all of the problems solved by the invention described herein. Various embodiments of this invention are illustrated in the accompanying drawings and will be described in more detail herein below.

BRIEF SUMMARY OF THE INVENTION

An inventive system and method of combining pumped hydro energy storage with thermal energy storage is disclosed.

In a preferred embodiment, a closed loop system may be constructed in which a suitable fluid may be moved between an upper fluid storage reservoir and a lower fluid storage reservoir. Such a system may be used both to contain fluid as part of a pumped energy storage system and as a heat pond for the thermal storage of energy, in this instance a solar thermal storage system.

To power the pumped energy storage system, electricity that may, for instance, be excess electrical power, may be stored as gravitational potential energy by using it to pump a fluid from a lower fluid storage unit to an upper storage unit using an electrically powered turbine. At a later time, fluid stored in the upper fluid storage may be run down back to the lower fluid storage, generating electricity as it flows through the turbine under the force of gravity. The turbine may also be a pump operated in reverse. Such a process may be about 80% efficient in regenerating the electricity initially used to pump the fluid up. The excess electrical power may be taken from the electrical grid, or it may be electricity from a solar or a wind turbine, or some combination thereof. The generated electricity may then be distributed via conventional means either locally or to distant parts of the electrical grid.

Either, or both, fluid storage regions may also be used to store thermal energy collected by, for instance, one or more solar thermal panels. This collected thermal energy may be transferred into the stored fluid via liquid-to-liquid heat exchangers. The extracted thermal energy may, for instance, then be distributed in a suitable fluid system. The extracted thermal energy may be used as source fluid to improve the heating efficiency of one or more heat pumps, or it may be used to directly heat or cool one or more building units, or some combination thereof.

The fluid used in the reservoirs may be water, or it may be any suitable high-density fluid, such as, but not limited to, the drilling fluid used in the oil industry that is typically referred to as "drilling mud". Drilling mud can vary from being equal in density to water to being about 2.75 times as dense as water. Typically, drilling mud is formulated by adding finely ground, high specific gravity (sg) minerals to water or oil. A typical drilling mud may, for instance, consist of finely ground baryte ($BaSO_4$, sg. 4.5), dispersed in water or oil.

Therefore, the present invention succeeds in conferring the following, and others not mentioned, desirable and useful benefits and objectives.

It is an object of the present invention to reduce the infrastructure costs of energy storage systems by making dual use of major infrastructure components.

It is another object of the present invention to provide reduced infrastructure costs by storing both gravitational potential energy and thermal energy in a common reservoir.

Yet another object of the present invention is to provide smaller reservoir sizes by using fluids that are significantly denser than water.

DETAILED DESCRIPTION OF THE INVENTION

Figure 1:
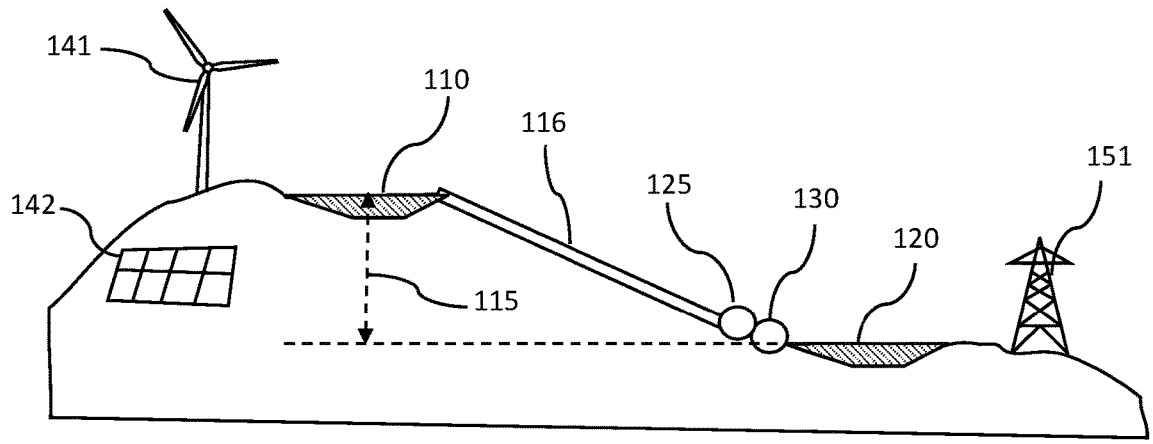
FIG. 1 shows a schematic cross-sectional drawing of an exemplary, prior art, conventional pumped hydro gravitational energy storage system.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic cross-sectional drawing of an exemplary, prior art, conventional pumped hydro gravitational energy storage system. Pumped hydro gravitational energy storage, or pumped-storage hydropower, is a type of hydroelectric energy storage that typically uses two water reservoirs at different elevations. Power may be generated as water moves down through a turbine. The turbine may later use excess electrical power to pump water to the upper reservoir, thereby storing energy in the form of the gravitational potential energy of the water in the upper reservoir. Pumped-storage currently accounts for 95% of all utility-scale energy storage in the United States.

As shown in FIG. 1, there may be an elevated fluid reservoir 110 that is a vertical height 115 above a source of fluid 120, or lower reservoir. A fluid conduit 116, or penstock, may allow the fluid stored in the upper, elevated reservoir to flow down to the lower reservoir via a fluid operated electrical generator 130. As the fluid flows down through the fluid operated electrical generator 130 electricity may be generated, thereby converting the gravitational potential energy of the fluid into electrical energy. The electricity generated may then be distributed for use via, for instance, the electrical power grid 151. There may also be an electrically powered pump 125 that allows fluid to be pumped up from the source of fluid 120, or lower reservoir, to the elevated fluid reservoir 110, thereby converting electrical energy back to stored gravitational potential energy.

This arrangement may, for instance, act as a gravitational battery and be used to even out the supply of electricity from intermittent sources such as, but not limited to, a wind turbine 141 or a solar array 142. Wind energy may only be generated when a suitable wind is blowing and is, therefore, not very predictable. In order to match electrical energy demand with supply, when there is excess energy being produced, i.e., when the demand is less than the supply, the excess may be used to pump fluid up to elevated fluid reservoir 110. Later when the demand for electricity exceeds what the wind turbine 141 can supply, the deficit may be made up by flowing fluid down through the fluid operated electrical generator 130 to produce more electricity.

The same can be done with solar energy. Solar energy may only be generated when the sun shines. Excess electricity generated from solar arrays 142 during the day may be stored as gravitational potential energy by using the electrically powered pump 125 to transfer fluid from the lower source of fluid 120 up to the elevated reservoir. At night, electricity may then be produced by flowing the fluid back down through the fluid operated electrical generator 130.

Typical existing pumped hydro systems use water as the fluid. The lower source of fluid 120 may be a reservoir, or it may be a source such as a river or the sea.

Figure 2:
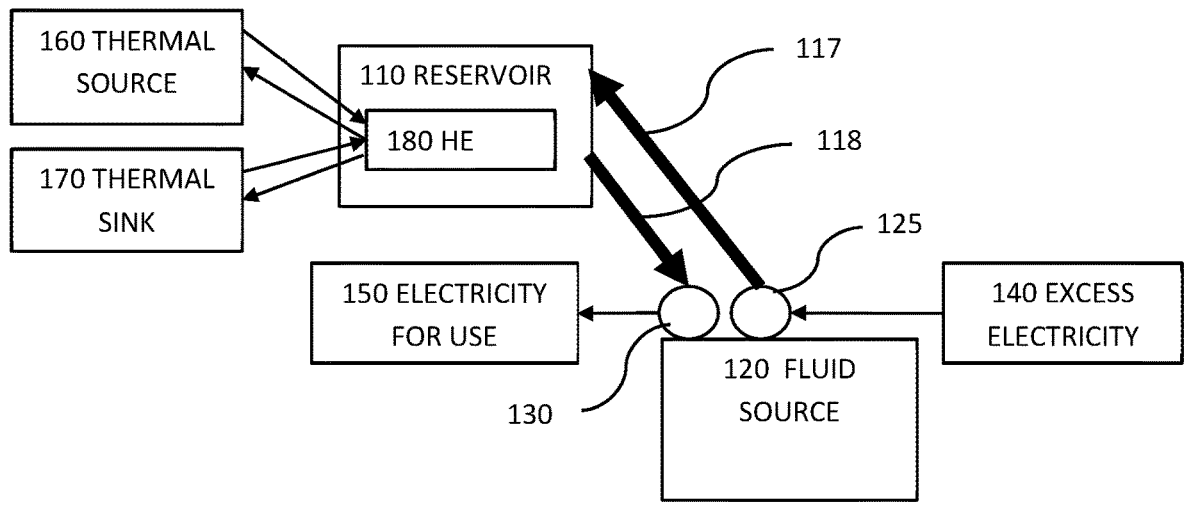
FIG. 2 shows a schematic drawing of a combined gravity and thermal energy storage system of one embodiment of the present invention.

FIG. 2 shows a schematic drawing of a combined gravity potential energy storage system and thermal energy storage system of one embodiment of the present invention. As with a typical pumped hydro gravity battery, there may an elevated fluid reservoir 110 that may be located at a vertical height 115 above a source of fluid 120. There may be a source of excess electricity 140 that may be connected to an electrically powered pump 125 to pump the fluid from the source of fluid up to the elevated reservoir. This may, for instance, be excess power from an electrical grid, or it may be excess power from some source such as, but not limited to, solar panels or wind turbines. Whatever the source of the excess electricity, it may be stored as gravitational potential energy by using it to pump fluid up from the lower reservoir or source of fluid 120 via a first fluid conduit 117 to the elevated fluid reservoir 110.

There may also be a sink, or user, of electricity 150 connected to distribute electricity obtained from a fluid operated electrical generator 130 when fluid flows out from the elevated reservoir.

In addition, the combined gravity and thermal energy storage system 100 may have a source of thermal energy 160 connected to transfer thermal energy into the fluid contained in the elevated fluid reservoir via a fluid-to-fluid heat exchanger 180. This source of thermal energy may, for instance, be a solar thermal array. In this way the fluid in the reservoir may be heated.

There may also be a sink of thermal energy 170 connected to transfer thermal energy out from fluid contained in the elevated fluid reservoir via the fluid-to-fluid heat exchanger. The sink of thermal energy 170 may, for instance, be a user of thermal energy such as, but not limited to, a building being heated, a heat pump or a district heating system.

Although only one fluid-to-fluid heat exchanger 180 is shown in FIG. 2, one of ordinary skill in the art may appreciate that separate fluid-to-fluid heat exchangers may be used for transferring thermal energy into and out of the reservoir fluid. One may also appreciate that although the thermal energy exchange has been described for heating the reservoir fluid, the system may be adapted for cooling the reservoir fluid so that cooled transfer fluid may be obtained and used for cooling structures.

An advantage of a combined gravity and thermal energy storage system 100 of the embodiment shown in FIG. 2 is that dual use may be made of the upper fluid storage 111 unit reducing the infrastructure cost of, for instance, both a district heating project and an energy storage project.

Figure 3:
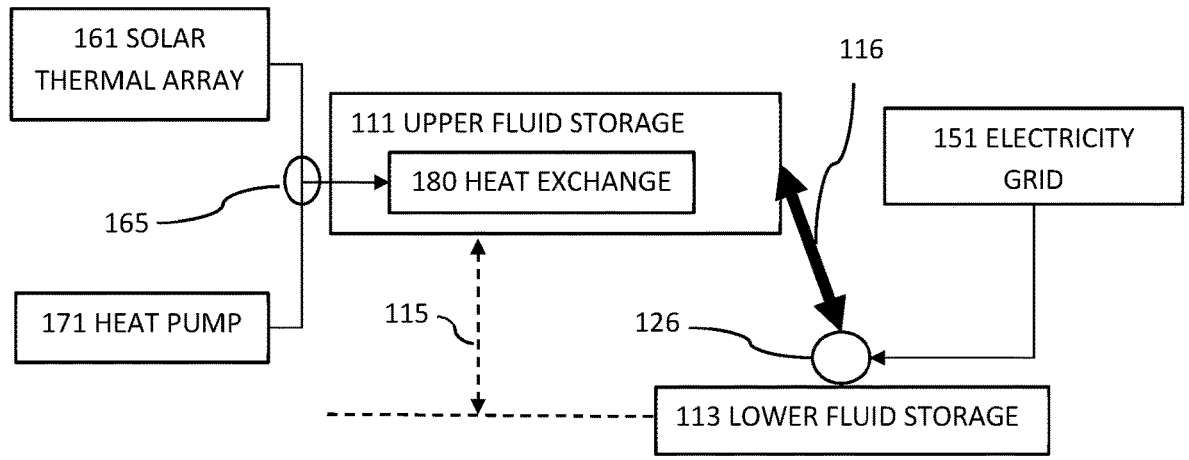
FIG. 3 shows a schematic drawing of a combined gravity and thermal energy storage system of a further embodiment of the present invention.

FIG. 3 shows a schematic drawing of a combined gravity and thermal energy storage system of a further embodiment of the present invention.

In this embodiment, there may be an upper fluid storage upper fluid storage 111 and a lower or second fluid reservoir 113 that may be separated by a vertical height 115. The amount of gravitational potential energy that may be stored in the upper fluid storage 111 is a product of the volume of the upper fluid storage 111, the vertical height 115 and the density of the fluid used.

One example of an industrial scale pumped-storage hydroelectric facility is the Raccoon Mountain Pumped-Storage Plant in Tennessee. The fluid used is water that is pumped up approximately 1000 feet (300 meters) from the Nickajack Lake on the Tennessee River to a 528-acre storage reservoir on Raccoon Mountain that can hold approximately 1.3 million gallons. The plant has a maximum power output of 1,652 megawatts (2,215,000 hp) which it can generate for up to 22 hours. It has a round-trip efficiency between 70-80%.

However, smaller facilities storing power in a range of 10 MW to 50 MW may utilize vertical drops that may be as small as 50 meters and smaller capacity reservoirs. The reservoir capacity may be further reduced by using easily pumped, heavier than water fluids such as, but not limited to, drilling fluid used in the oil industry that is often referred to as "drilling mud". Drilling mud can vary in density from being equal to water to being about 2.75 times as dense as water. Typically, drilling mud is formulated by adding finely ground, high specific gravity (sg) minerals to water or oil. A typical drilling mud may, for instance, consist of finely ground baryte ($BaSO_4$, sg. 4.5), dispersed in water or oil.

A usable fluid that is twice as dense as water may, therefore, be used as long as both the upper and lower fluid reservoirs are contained, preferably enclosed.

The system may have a combined fluid pump and electricity generator 126, such as a reversible turbine, that may be located close to the lower fluid storage 113. This combined fluid pump and electricity generator 126 may, for instance, be connected to the electrical power grid 151 so that at times of increased power demand, fluid may be flowed down from the upper fluid storage 111 via a fluid conduit 116 to the lower fluid storage 113 via the combined fluid pump and electricity generator 126 and electricity generated to provide extra electricity. At other times, when there is excess power, that excess power may be used to pump fluid up from the lower fluid storage 113 to the upper fluid storage 111 where it may store energy as gravitational potential energy.

As shown in FIG. 3, the upper fluid storage 111 may also contain a fluid-to-fluid heat exchanger 180. The fluid-to-fluid heat exchanger 180 may be coupled to a source of thermal energy such as, but not limited to, a solar thermal array 161 via a suitable switching valve 165. In that way, thermal energy obtained by the solar thermal array 161 may be used to heat the fluid contained in the upper fluid storage 111.

The fluid-to-fluid heat exchanger 180 may also be connected to a sink, or user of thermal energy such as, but not limited to, one or more heat pumps 171 via the switching valve 165. In that way, thermal energy stored in the fluid contained in the upper fluid storage 111 may be extracted and used for purposes such as, but not limited to, heating buildings.

One example of an industrial scale thermal pond that uses a reservoir of water containing a fluid-to-fluid thermal exchanger is the geothermal lake plate cooling system at the Metropolitan Nashville Airport in Nashville, Tenn. The airport takes advantage of a former 43-acre Hoover rock quarry, with an average depth of 150 feet. The quarry contains approximately 1.5 billion gallons of water. At a depth of 50 feet, the water is 50 degrees Fahrenheit year-round. The project takes advantage of that cool temperature by circulating water through closed looping and geothermal heat exchangers submerged in the quarry to the airport terminal's central plant, providing cooling for the entire terminal. The project is expected to reduce electricity usage by 6,000 kilowatts of peak demand and result in annual savings of 1.3 million kilowatt-hours and 30 million gallons of potable water. The utility savings to MNAA are expected to exceed $430,000 per year.

One of ordinary skill in the art may appreciate that although only one fluid-to-fluid heat exchanger is shown in FIG. 3, the system may instead use separate heat exchangers for introducing thermal energy into the fluid contained in the fluid storage region, and for extracting heat form the fluid. Furthermore, although FIG. 3 shows the heat fluid-to-fluid heat exchanger 180 in the upper fluid storage 111, the heat exchanger could instead be in the lower fluid storage 113, or there may be heat exchangers in both the upper and the lower fluid storage.

Figure 4:
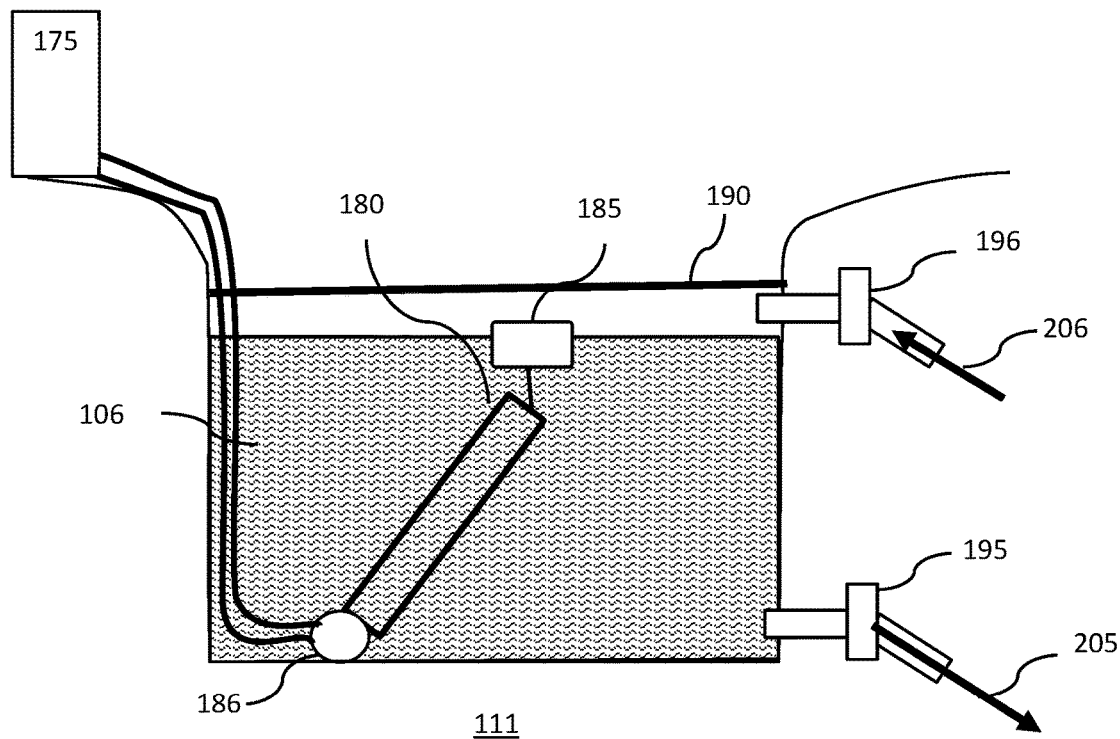
FIG. 4 shows a schematic cross-section of a fluid storage system of one embodiment of the present invention.

FIG. 4 shows a schematic cross-section of a fluid storage system of one embodiment of the present invention. As shown in FIG. 4, the fluid-to-fluid heat exchanger 180 may be mounted on a hinged joint 186 and also have a floatation device 185 attached to it. In that way, a suitably weighted fluid-to-fluid heat exchanger 180 may always be maintained within the fluid 106 stored in the upper fluid storage 111 even as fluid is pumped in or out.

The fluid-to-fluid heat exchanger 180 may be fluidly coupled to a pump station 175 that may serve to pump heated fluid to or from it to either a source of thermal energy or a sink of thermal energy.

The upper fluid storage 111 may have a top cover 190 to completely contain it. The top cover 190 may, for instance, be sufficiently robust to support an earthen cover so that the upper fluid storage 111 may be concealed and have a minimal environmental impact.

The upper fluid storage 111 may have an inlet valve 196 through which fluid 206 may flow up through a conduit from a pumping station below.

The upper fluid storage 111 may also have an outlet valve 195 through which fluid 205 may flow down through a conduit to a turbine below.

In an alternate embodiment, the fluid-to-fluid heat exchanger may be constructed of a heavy material such as, but not limited to, stainless steel, and may be positioned at the base of the fluid storage region, at a level below the outlet valve so as to ensure that it is always submerged.

Figure 5:
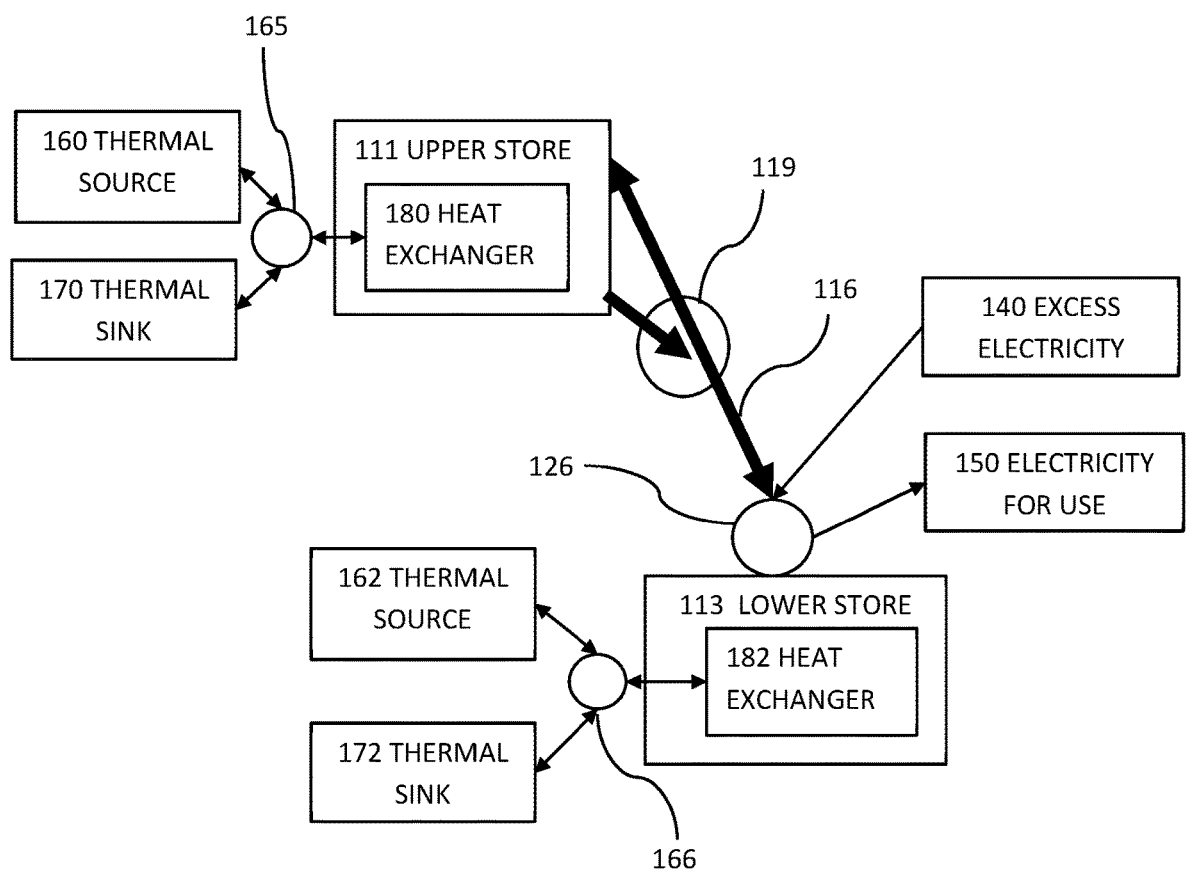
FIG. 5 shows a schematic drawing of a combined gravity and thermal energy storage system of another embodiment of the present invention.

FIG. 5 shows a schematic drawing of a combined gravity and thermal energy storage system of another embodiment of the present invention.

In the embodiment of FIG. 5, there may be a second fluid-to-fluid heat exchanger 182 housed in the lower fluid storage 113 as well as the fluid-to-fluid heat exchanger 180 housed in the upper fluid storage 111. In this way thermal energy may be added to the fluid both when it is in the lower store and in the upper store. The thermal energy added to the lower fluid storage 113 may be obtained via a second switching valve 166 from a second source of thermal energy 162. Alternatively, the thermal energy for the lower fluid storage 113 may be obtained from the same source of thermal energy 160 that supplies the upper fluid storage 111.

Similarly, thermal energy from the upper fluid storage 111 may be supplied to a second sink of thermal energy 172 via a suitable second switching valve 166, or it may be supplied to the same sink of thermal energy 170 that is being supplied from the upper fluid storage 111.

In further embodiments, thermal energy may be supplied to the fluid in the upper fluid storage 111 and used in the lower fluid storage 113, or it may be supplied to the fluid while it is in the lower fluid storage 113 and used when the fluid is in the upper fluid storage 111.

As shown in FIG. 5, there may be a combined fluid pump and electricity generator 126 that uses a source of excess electricity 140 to pump fluid up to the upper fluid storage 111 via a fluid conduit 116. The same combined fluid pump and electricity generator 126 may also be used to generate electricity for a suitable sink of electricity 150 when fluid flows down from the upper fluid storage 111.

There may also be a conduit valve coupling 119 so that a single fluid conduit 116 may deliver fluid up and down the greater part of the vertical distance between fluid stores, but the conduit may split in two near the base of the upper fluid storage 111 so that incoming fluid is delivered to the top, or near the top, of the upper fluid storage 111, while outgoing fluid is extracted from the bottom, or near the bottom, of the upper fluid storage 111.

Although the systems described above have been described as thermal systems that heat the reservoir, one of ordinary skill in the art will appreciate that thermal ponds may also be used to provide cooling for structures. To that end, the systems may be adapted to cool the fluid in the reservoir by, for instance, passing cool transfer fluid obtained at night from an air-fluid thermal exchange unit through the fluid-to-fluid exchange in the reservoir. Cool fluid may then be extracted from the reservoir fluid by running a suitable transfer fluid either through the same fluid-to-fluid transfer unit in the reservoir, or via a second such fluid-to-fluid transfer unit in the reservoir. The cooled transfer fluid may then be used to cool structures directly or may be used to enhance the efficiency of a heat pump operating in cooling mode.

In a further embodiment, there may be an installation have two combined gravity and thermal energy storage systems. One of the combined gravity and thermal energy storage systems may then be used for cooling the reservoir fluid and the other for heating the reservoir fluid. Such an arrangement may, for instance, allow a thermal sink connected to both of them to take advantage of beneficial modes of operation such as, but not limited to, heating in winter and cooling in summer as described in detail in, for instance US 2021-0102764 entitled "System and Method for Managing Source Fluid" that was published on Apr. 8, 2021, the contents of which are fully incorporated herein by reference.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A combined gravity and thermal energy storage system, comprising:
   an elevated liquid reservoir located at a vertical height above a source of liquid; a source of excess electricity connected to an electrically powered pump to pump said liquid from said source of liquid up to said elevated reservoir;
   a sink of electricity connected to obtain electricity from a liquid operated electrical generator when said liquid flows out under the pull of gravity from said elevated reservoir;

a source of thermal energy connected via a switching valve to transfer thermal energy into said liquid contained in said elevated liquid reservoir via a liquid-to-liquid heat exchanger; and, a sink of thermal energy connected via said switching valve to transfer thermal energy out from said liquid contained in said elevated liquid reservoir via said liquid-to-liquid heat exchanger.

2. The system of claim 1, further comprising:

a second fluid to liquid-to-liquid heat exchanger connected to transfer thermal energy from said liquid contained in said elevated liquid reservoir to said sink of thermal energy.

3. The system of claim 2 wherein, said liquid is at least twice as dense as water.

4. The system of claim 3, wherein, said vertical height is greater than or equal to 50 meters.

5. The system of claim 4, wherein, said source of liquid is a second liquid reservoir.

6. The system of claim 5 wherein both said elevated reservoir and said second liquid reservoir are enclosed reservoirs.

7. The system of claim 6, wherein, said liquid comprises drilling mud.

8. The system of claim 7, wherein, said drilling mud comprises BaSO4.

9. The system of claim 2, wherein, said source of thermal energy comprises a solar thermal array and said sink of thermal energy comprises a heat pump.

10. The system of claim 2, wherein, said sink of thermal energy comprises a district heating system.

11. The system of claim 2, wherein, said heat exchangers are constructed to operate such that it said heat exchangers remain submerged in liquid contained in said elevated liquid reservoir.

12. The system of claim 11, wherein, said liquid-to-liquid heat exchanger comprises a floatation device attached such that the liquid-to-liquid heat exchanger remains submerged in said liquid contained in said elevated liquid reservoir.

13. The system of claim 6, further comprising a second liquid-to-liquid heat exchanger contained in said second liquid reservoir and connected via a second switching valve such that thermal energy is transferred into said liquid contained in said second liquid reservoir from said source of thermal energy, and out from said liquid contained in said second liquid reservoir to said sink of thermal energy.

14. A system comprising two combined gravity and thermal energy storage systems of claim 1, a first one of which is used for cooling the reservoir liquid and a second one of which is used for heating the reservoir liquid.

* * * * *